R. Knott.
Confining Horse Power.
N° 86,677. Patented Feb. 9, 1869.

Witnesses
Geo. H. Strong
J. L. Boone.

Inventor
Richard Knott
By Dewey & Co
His Attys

RICHARD KNOTT, OF SUISUN, CALIFORNIA.

Letters Patent No. 86,677, dated February 9, 1869.

IMPROVED APPARATUS FOR CONFINING HORSE-POWERS.

The Schedule referred to in these Letters Patent and making part of the same.

*To all whom it may concern:*

Be it known that I, RICHARD KNOTT, of Suisun, county of Solano, State of California, have invented an "Improved Mode of Confining Horse-Powers;" and I do hereby declare that the following description and accompanying drawings are sufficient to enable any person skilled in the art or science to which it most nearly appertains, to make and use my said invention, or improvement, without further invention or experiment.

The object of my invention is to provide a new and improved mode of confining horse-powers to the ground, and especially those used for separators, and consists in so confining the power, by means of iron bars and stakes, that it cannot be shifted or moved from its place, and especially in confining the corners of the frame, or bed, so that they will not be lifted or moved by a side-strain. In most apparatus used for this purpose, when the horses arrive at a point diagonal to each corner, that corner is raised, and after a while the work must be stopped and the timbers be again secured.

My invention consists in tying down the corners of the frame by means of bars secured to them, and extending to a distance from the power, where they are staked firmly to the ground. I also attach near each corner an arm, which extends out from the side of the frame, which is also secured to the ground by a stake, and assists in keeping the power to its place.

To more fully explain my invention, reference is had to the accompanying drawings, forming part of this specification, of which—

Figure 1:
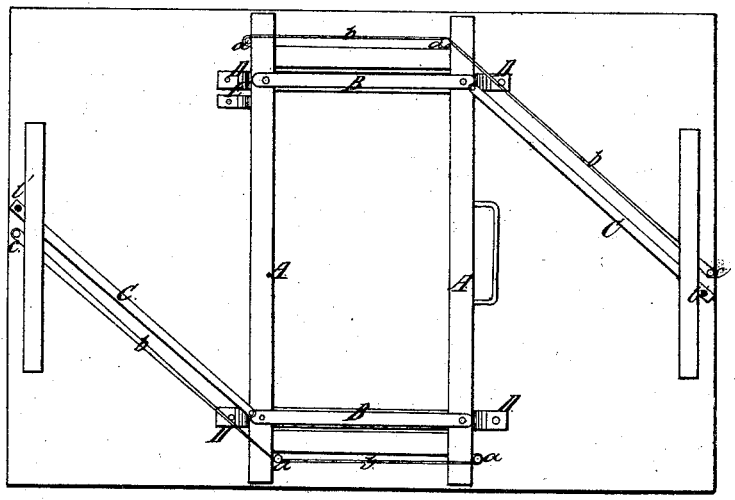
Figure 1:
Figure 2:
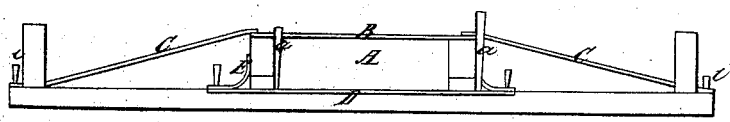

Figure 1 is a top view.
Figure 2 is an end view.

Similar letters of reference in each of the figures indicate like parts.

A is the frame which supports the power, and by means of which it is secured to the ground.

In the usual manner of securing this frame, stakes, *a a a*, are used, driven down beside the timbers of the frame, as shown at fig. 1, and a rope or chain, *b*, passes across the top of the frame, passing around the tops of the stakes *a*, and is secured to a stake, *c*, driven at a short distance from the power. This fastening may answer in some places, yet it is always a source of annoyance, as the continual strain will cause it to give, and thus render frequent stoppages necessary, in order to secure the power more firmly.

In my device, I place across the top of the frame, near each end, two flat iron bars, B B, and secure their ends to the timbers on each side.

At one end of each of these bars, and on opposite sides of the frame, I attach iron rods, C C, which extend to a distance of from six to ten feet from the power, at an angle to the longitudinal timbers of the frame, and secure their opposite ends to the ground by iron pins, or stakes, *i i*.

This device prevents the power from shifting in either direction, but does not steady the corners. To accomplish this object, either of two devices, similar in construction, which are shown in the drawings, may be used, one of which may be described as follows:

A bar of iron, D, is placed under each end of the frame. The end of this bar extends beyond the timbers of the frame on each side, and are bent back upon the bar, and the extremities secured to the sides of the timbers. The double portion is then staked firmly to the ground.

The other device consists merely of small straps of iron, E, which clasp the timbers at the bottom, and are bent upon themselves, and secured as above described.

By this means, the horse-power is firmly anchored to the ground, and a strain, from any direction, will have no effect whatever.

The power can be easily released and moved when desired, by removing the stakes and folding the bars C C upon the timbers.

Having thus described my invention,

What I claim, and desire to secure by Letters Patent, is—

The bars B B and D D, rods C C, and straps E, in combination with the frame A, the whole constructed and arranged substantially as and for the purpose above described.

RICHARD KNOTT. [L. S.]

Witnesses:
L. P. MARSHALL,
WM. S. WELLS.